United States Patent
Vanapalli et al.

(10) Patent No.: US 10,390,277 B2
(45) Date of Patent: Aug. 20, 2019

(54) MOBIKE AWARE LTE TO WI-FI HANDOFF OPTIMIZATION

(71) Applicant: Samsung Electronics Co., Ltd, Suwon-si (KR)

(72) Inventors: Ravikanth Vanapalli, Edison, NJ (US); Niranjan, The Colony, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 15/365,915

(22) Filed: Nov. 30, 2016

(65) Prior Publication Data
US 2018/0152871 A1    May 31, 2018

(51) Int. Cl.
| | |
|---|---|
| *H04W 12/04* | (2009.01) |
| *H04W 12/06* | (2009.01) |
| *H04W 36/38* | (2009.01) |
| *H04W 36/14* | (2009.01) |
| *H04L 29/06* | (2006.01) |
| *H04W 36/00* | (2009.01) |
| *H04J 11/00* | (2006.01) |
| *H04W 84/12* | (2009.01) |
| *H04W 88/16* | (2009.01) |

(Continued)

(52) U.S. Cl.
CPC ............ *H04W 36/14* (2013.01); *H04L 69/28* (2013.01); *H04W 12/04* (2013.01); *H04W 12/06* (2013.01); *H04W 36/0038* (2013.01); *H04J 11/00* (2013.01); *H04L 61/2007* (2013.01); *H04W 60/005* (2013.01); *H04W 84/12* (2013.01); *H04W 88/16* (2013.01)

(58) Field of Classification Search
CPC ....... H04J 11/00; H04W 12/04; H04W 12/06; H04W 36/14; H04W 84/12; H04W 88/16; H04W 36/0011; H04W 36/0038; H04L 61/6068; H04L 69/28
See application file for complete search history.

(56) References Cited

U.S. PATENT DOCUMENTS

| | | |
|---|---|---|
| 6,418,130 B1 * | 7/2002 | Cheng ................. H04L 63/06 370/328 |
| 8,396,971 B2 | 3/2013 | Pashalidis |
| 8,964,695 B2 | 2/2015 | Bachmann et al. |

(Continued)

FOREIGN PATENT DOCUMENTS

EP    2194686 A1    6/2010

*Primary Examiner* — Erica Navar

(57) ABSTRACT

An embodiment of this disclosure provides a user equipment (UE) for managing handovers between different networks. The UE includes a memory and at least one processor operably connected to the memory. The at least one processor is configured to establish security associations with an evolved data packet gateway (ePDG) over a Wi-Fi network. The at least one processor is also configured to indicate MOBIKE support and a specific timer value corresponding to a specific period of time for maintaining the security associations. The at least one processor is also configured to, after establishing the security associations, perform a handover from the Wi-Fi network to a long term evolution (LTE) network. The at least one processor is also configured to maintain the security associations for the specific period of time corresponding to the specific timer value after performing the Wi-Fi to LTE handover and disconnecting from the Wi-Fi network.

17 Claims, 7 Drawing Sheets

(51) Int. Cl.
  *H04L 29/12* (2006.01)
  *H04W 60/00* (2009.01)

(56) References Cited

U.S. PATENT DOCUMENTS

| | | | |
|---|---|---|---|
| 2011/0216743 A1* | 9/2011 | Bachmann | H04L 63/164 370/331 |
| 2013/0322347 A1 | 12/2013 | Alex et al. | |
| 2014/0376511 A1 | 12/2014 | Kalapatapu et al. | |
| 2015/0195771 A1 | 7/2015 | Hurtta | |
| 2016/0285627 A1* | 9/2016 | Sedlacek | H04L 43/00 |

\* cited by examiner

MOBIKE AWARE LTE TO WI-FI HANDOFF OPTIMIZATION

TECHNICAL FIELD

This disclosure relates generally to wireless communication systems. More specifically, this disclosure relates to a mobility and multihoming protocol for Internet key exchange version 2 (IKEv2) (MOBIKE) aware long-term evolution (LTE) to Wi-Fi handoff optimization.

BACKGROUND

The rapid development of LTE network opens up new opportunities to both mobile carriers and device original equipment manufacturers (OEMs). Due to higher throughput, lower latency and faster connection times, many new applications related to the LTE network have emerged. For example, voice over LTE (VoLTE) transmits higher quality voice calls through an LTE network and provides advantages such as higher efficiency and robust global roaming. As the LTE networks are being continually deployed, the capability of mobile devices to perform seamlessly handover of VoLTE calls to non-LTE networks (e.g., Wi-Fi network) will be a key technology for higher quality voice call experience to mobile users. Therefore, an efficient and seamless handover technique between the LTE and non-LTE networks is needed to improve VoLTE call performances and throughput.

SUMMARY

This disclosure provides a MOBIKE aware LTE to Wi-Fi handoff optimization.

An embodiment of this disclosure provides a user equipment (UE) for managing handovers between different networks. The UE includes a memory and at least one processor operably connected to the memory. The at least one processor is configured to establish security associations with an evolved data packet gateway (ePDG) over a Wi-Fi network. The at least one processor is also configured to indicate MOBIKE support and a specific timer value corresponding to a specific period of time for maintaining the security associations. The at least one processor is also configured to, after establishing the security associations, perform a handover from the Wi-Fi network to a long term evolution (LTE) network. The at least one processor is also configured to maintain the security associations for the specific period of time corresponding to the specific timer value after performing the Wi-Fi to LTE handover and disconnecting from the Wi-Fi network.

Another embodiment of this disclosure provides method of operating user equipment (UE) for managing handovers between different networks. The method includes establishing security associations with an evolved data packet gateway (eDPG) in a Wi-Fi network. The method also includes indicating MOBIKE support and a specific timer value corresponding to a specific period of time for maintaining the security associations. The method also includes, after establishing the security associations, performing a handover from the Wi-Fi network to a long term evolution (LTE) network. The method also includes maintaining the security associations for the specific period of time corresponding to the specific timer value after performing the Wi-Fi to LTE handover and disconnecting from the Wi-Fi network.

Yet another embodiment of this disclosure provides an evolved data packet gateway (ePDG). The ePDG comprises a memory and at least one processor operably connected to the memory. The at least one processor configured to establish internet key exchange (IKE) security associations with a user equipment (UE) over a Wi-Fi network. The at least one processor is also configured to receive an indication of multihoming protocol for Internet key exchange version 2 (MOBIKE) support and a specific timer value corresponding to a specific period of time for maintaining the IKE security associations, from the UE. The at least one process is also configured to, after establishing the IKE security associations and a handover of the UE from the Wi-Fi network to a long term evolution (LTE) network, receive a delete bearer request from the LTE network. The at least one processor is also configured to start a MOBIKE timer using the specific timer value for the specific period of time in response to receiving the delete bearer request from the LTE network.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The descriptions of FIGS. 1-4 are not meant to imply physical or architectural limitations to the manner in which different embodiments may be implemented. Different embodiments of the present disclosure may be implemented in any suitably-arranged communications system.

Figure 1:
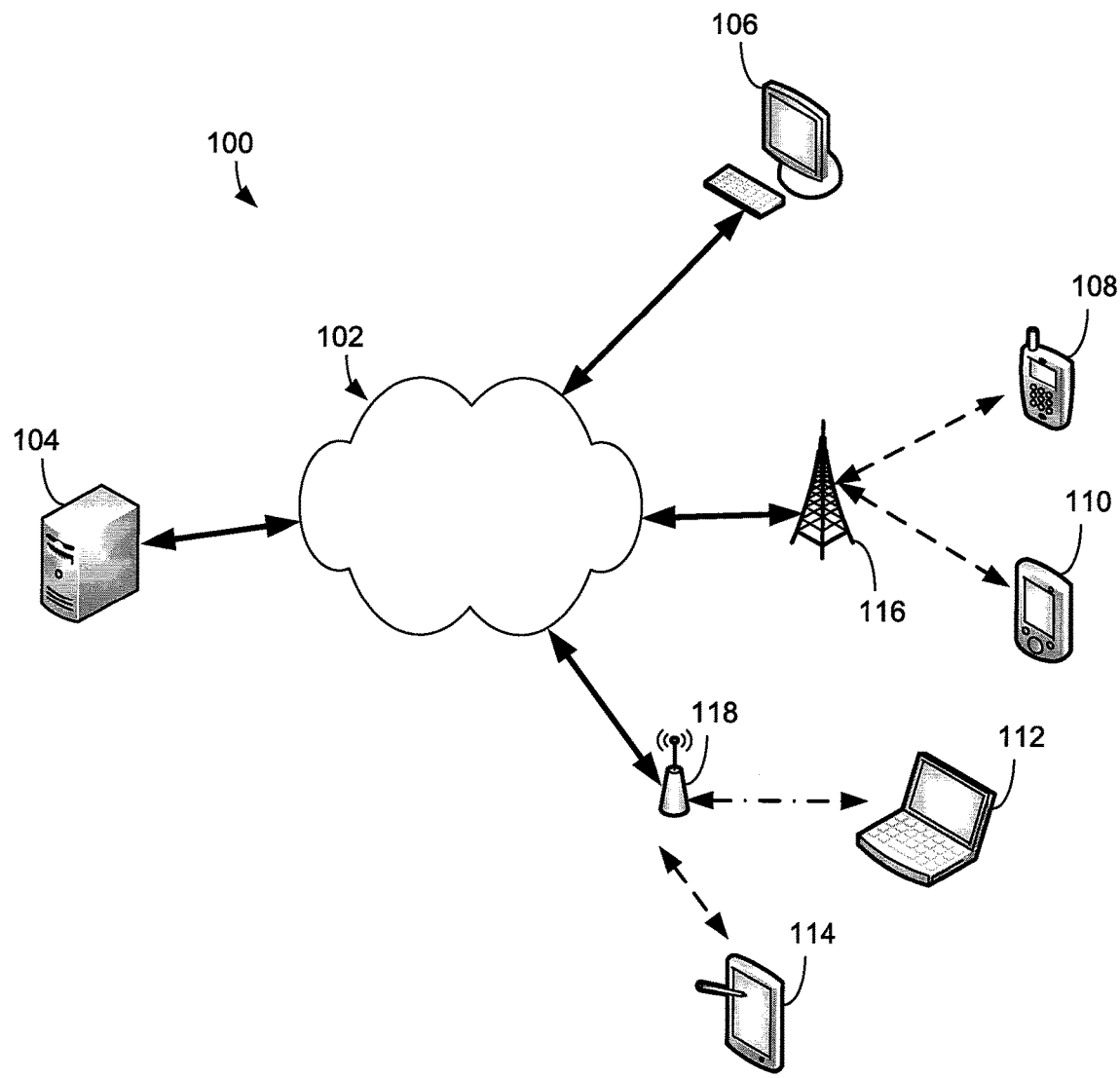
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices, including providing multi-endpoint services for evolved packet data gateway (ePDG) supported devices. Each server 104 could, for example, include one or more processing devices, one or more memory elements storing instructions and data, and one or more network interfaces facilitating communication over the network 102 or simultaneously transmit an incoming call to multiple endpoint devices.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, one or more of the client devices 108-114 include circuitry, programming, or a combination thereof, for transmitting a timer for maintaining an IKEv2 security association with an ePDG. As used herein, references to IKE will refer to IKEv2. In certain embodiments, and one or more of the base station 116 or wireless access point 118 includes circuitry, programming, or a combination thereof, for providing a VoLTE call handover from a LTE network to a non-LTE network and vice-versa.

In some embodiments, the client devices 108-114 may detect network capability. For example, the client devices 108-114 may identify a VoLTE call handover operation from an LTE network to a non-LTE network, for example, Wi-Fi. The client devices 108-114 may initiate a VoLTE call in a LTE network. The client devices 108-114 measure signal strength of the communication networks and for triggering a VoLTE call handover operation to a non-LTE network, for example, Wi-Fi.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
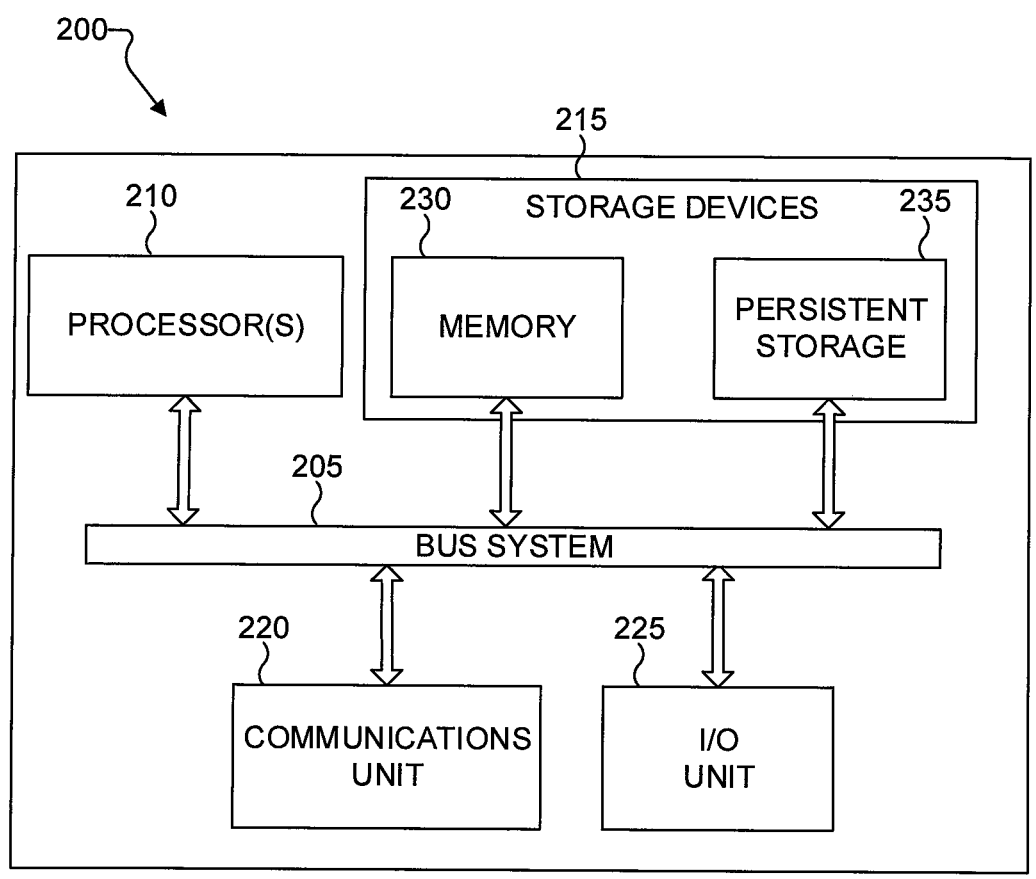
FIGS. 2 and 3 illustrate example devices in a computing system according to various embodiments of the present disclosure.
Figure 3:
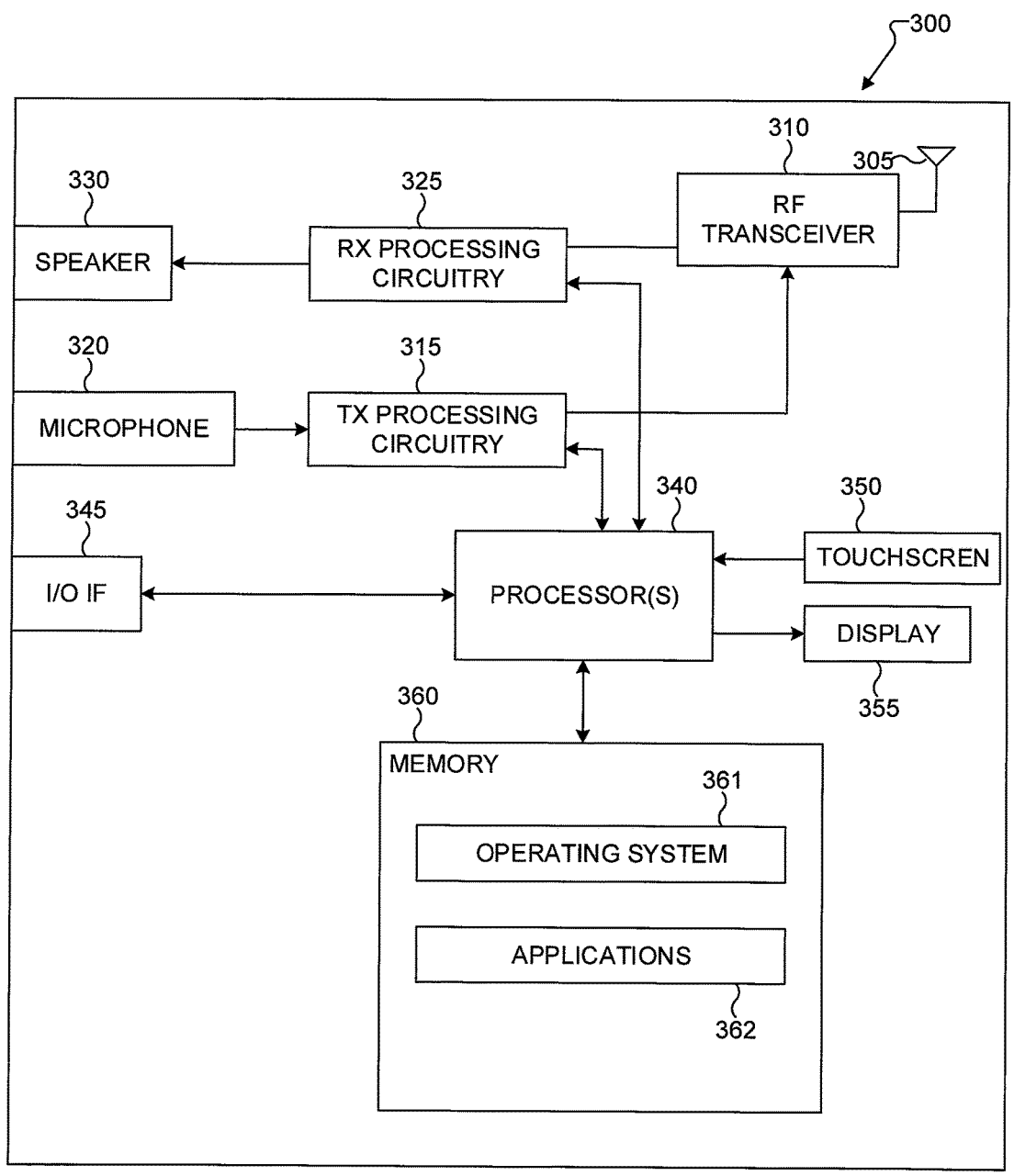

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200, such as an ePDG gateway, includes a bus system 205, which supports communication between one or more processors 210, at least one storage device 215, at least one communication interface 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations such as processes to start a MOBIKE timer after VoLTE call handover from a non-LTE network to a LTE network. More specifically, the timer indicates how long the UE will maintain security associations for a Wi-Fi network.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for a MOBIKE timer after VoLTE call handover from a non-LTE network to a LTE network, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300, such as a user equipment (UE), includes an antenna 305, a radio frequency (RF) transceiver 310, transmit (TX) processing circuitry 315, a microphone 320, and receive (RX) processing circuitry 325. The client device 300 also includes a speaker 330, one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for a MOBIKE timer after VoLTE call handover from a non-LTE network to a LTE network. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 implements an apparatus that can initiate or receive an incoming call to or from server 104 over network 102. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
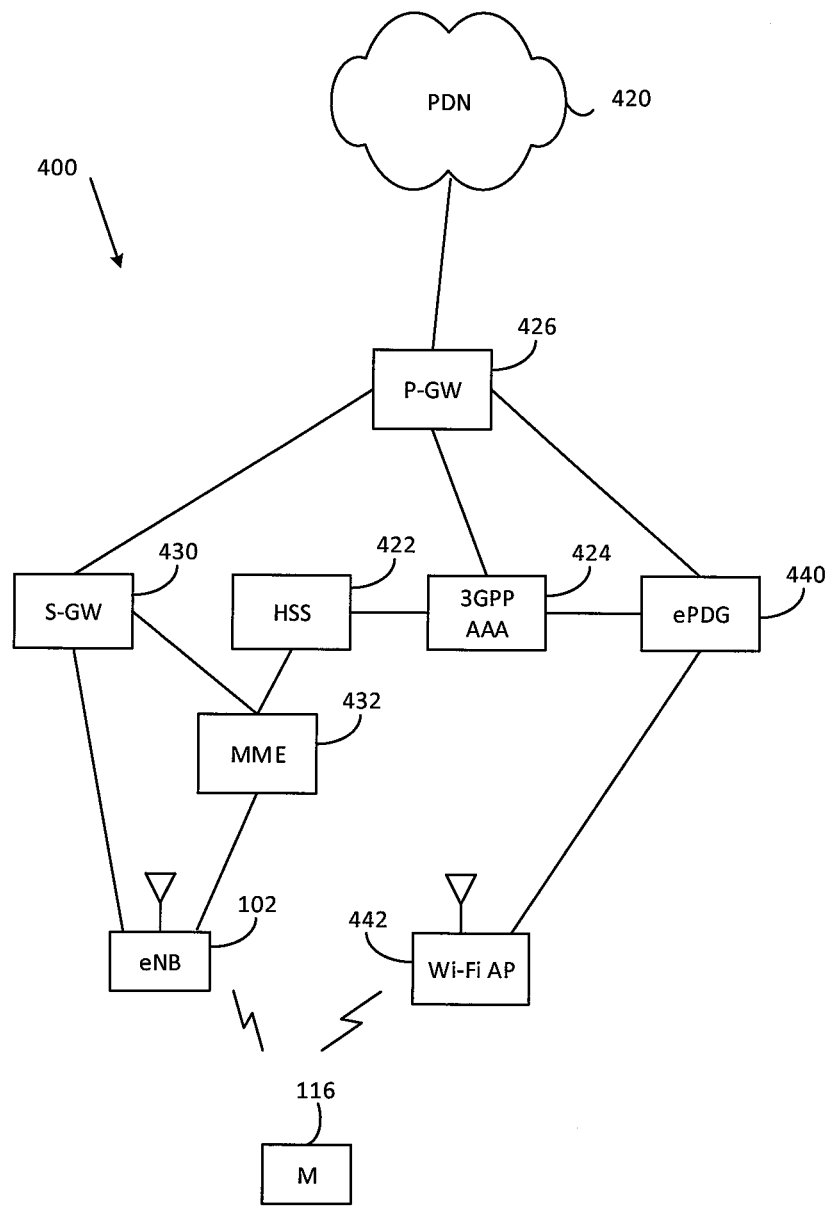
FIG. 4 illustrates an example wireless network with an evolved packet data gateway (ePDG) according to various embodiments of this disclosure.

FIG. 4 illustrates an example wireless network 400 with an evolved Packet Data Gateway (ePDG) 440 according to various embodiments of this disclosure. The embodiment of the wireless network 400 shown in FIG. 4 is for illustration only. Other embodiments of the wireless network 400 could be used without departing from the scope of this disclosure.

In FIG. 4, the wireless network 400 includes UE 116, a Packet Data Network (PDN) 420, a Home Subscriber Server (HSS) 422, a 3GPP (Authentication, Authorization and Accounting (AAA) 424, PDN-gateway (P-GW) 426, a Serving Gateway (S-GW) 430, a Mobility Management Entity (MME) 432, a base station (BS) 102, the evolved Packet Data Gateway (ePDG) 440 and a Wireless Fidelity Access Point (Wi-Fi AP) 442. The wireless network 400 can work in cooperation and as part of wireless network 100 as shown in FIG. 1.

In an embodiment of this disclosure, the UE 116 receives data from the PDN 420 through the P-GW 426, the S-GW 430, and the BS 102, and transmits data to the PDN 420. When connection state with the BS 102 becomes weak, the UE 116 handovers to the Wi-Fi AP 442. The UE 116 communicates with the 3GPP AAA server 424 to perform authentication. If the authentication is successfully performed, in an example using Proxy Mobile IPv6 (PMIPv6) protocol, the ePDG 440 transmits a Proxy Binding Update (PBU) message to the P-GW 426. The PBU message is a message for requesting that a path directing to the UE 116 be changed. The P-GW 426 having received the PBU message changes a path directing to the UE 116 and transmits a Proxy Binding Acknowledge (PBA) message to the ePDG 440 as a response with respect to the PBU message.

According to another embodiment, the ePDG 440 can be connected to the P-GW 426 through a General packet radio service Tunneling Protocol (GTP) path instead of a PMIPv6 path. In this example, the ePDG 440 transmits a Create Session Request message instead of the PBU to the P-GW 426 and receives a Create Session Response message from the P-GW 426 to open a GTP path.

Although FIG. 4 illustrates one example of UE 116, various changes may be made to FIG. 4. For example, various components in FIG. 4 could be combined, further subdivided, or omitted and additional components could be added according to particular needs. As a particular example, while FIG. 4 illustrates the UE 116 configured as a mobile telephone or smartphone, UEs could be configured to operate as other types of mobile or stationary devices.

Figure 5:
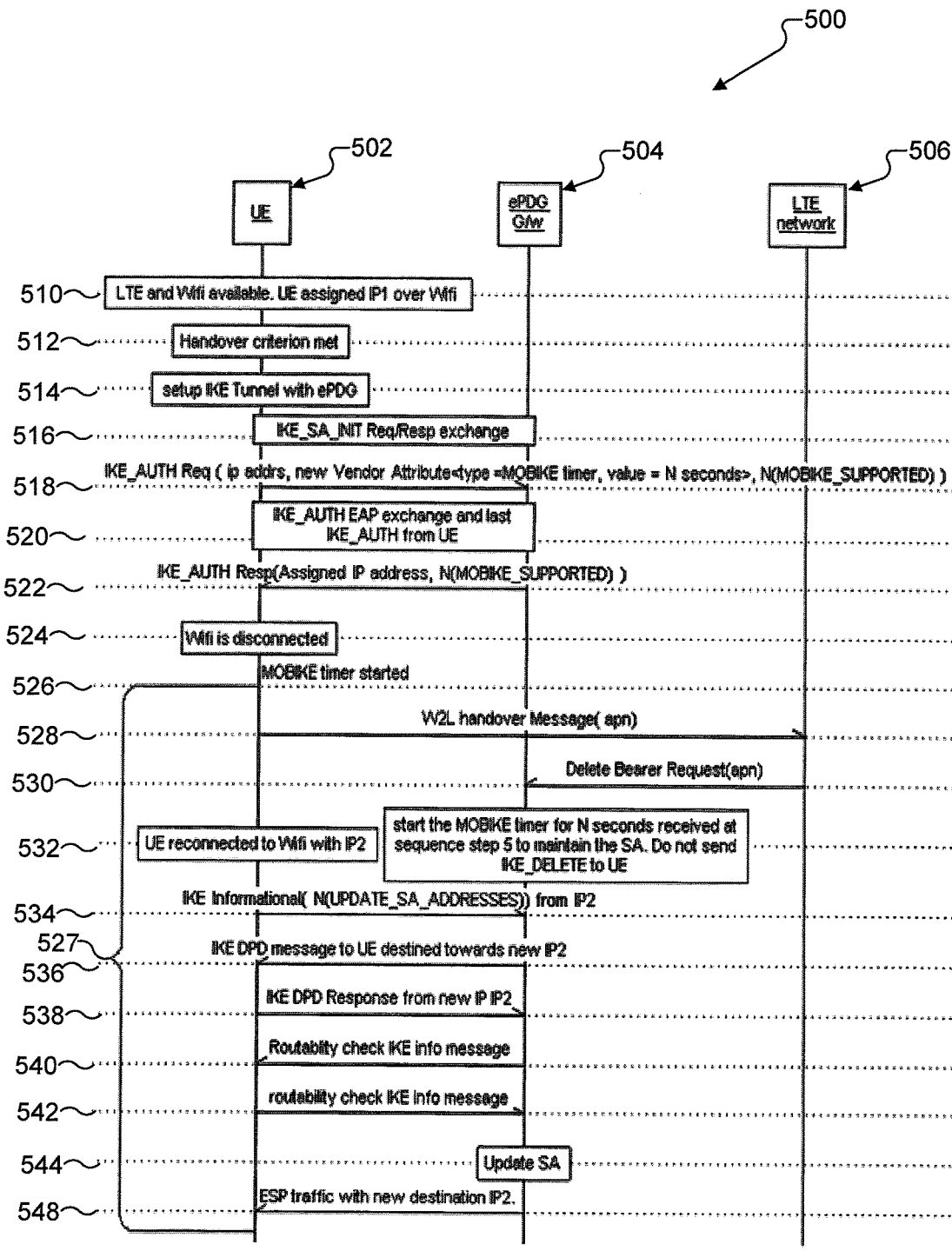
FIG. 5 illustrates an example signaling call flow of MOBIKE aware LTE Wi-Fi handoff optimization according to embodiments of the present disclosure.

FIG. 5 illustrates an example signaling call flow of MOBIKE aware LTE Wi-Fi handoff optimization 500 according to embodiments of the present disclosure. The embodiment of the signaling call flow of the MOBIKE aware LTE Wi-Fi handoff optimization 500 illustrated in FIG. 5 is for illustration only, and the signaling call flow of the MOBIKE aware LTE Wi-Fi handoff optimization 500 of FIG. 5 could have the same or similar configuration. However, the signaling call flow of the MOBIKE aware LTE Wi-Fi handoff optimization 500 comes in a wide variety of configurations, and FIG. 5 does not limit the scope of this disclosure to any particular implementation of the flow diagram of the MOBIKE aware LTE Wi-Fi handoff optimization 500.

As shown in FIG. 5, the MOBIKE aware LTE Wi-Fi handoff optimization 500 includes messaging between a UE 502, ePDG G/W 504, and LTE network 506. The UE 502 can be one example of UE 116 as shown in FIGS. 1 and 3.

The MOBIKE aware LTE Wi-Fi handoff optimization 500 can begin at step 510. At step 510, the UE 502 identifies that both LTE and Wi-Fi are available and the UE 502 is assigned IP1 over Wi-Fi. At step 512, the UE 502 determines whether a handover criterion is met for handover to the Wi-Fi network using the ePDG G/W 504. If the handover criterion is met at step 512, the UE 502 sets up an IKE tunnel with the ePDG G/W 504 at step 514.

At step 516, the UE 502 and ePDG G/W 504 communicate to initiate IKE by exchanging two IKE SA_INIT messages. The UE 502 sends an IKE authentication request to the ePDG G/W 504 at step 518. The request includes one or more of a request for an IP address, a notification of a timer to be used, a value for the timer indicating a period of time, and an N timer. At step 520, the UE 502 and ePDG G/W 504 communicate to authenticate through an Extensible Authentication Protocol (EAP) exchange. At step 522, the ePDG G/W 504 sends the UE 502 an IKE authentication response. The response can include one or more of an assigned IP address and the N timer value.

At step 524, the Wi-Fi becomes disconnected. As shown in this diagram, the Wi-Fi becomes disconnected after the IKE authentication is complete. However, it is understood that this disconnection may take place at a later time and many other steps of data communication can occur between these two steps. At step 526, the MOBIKE timer starts at the UE 502. The set 527 of steps 528-548 include a period of time during which the MOBIKE timer is running or counting at the UE 502.

At step 528, the UE 502 sends a handover message to LTE network 506. The LTE network 506 sends a delete bearer request to ePDG G/W 504 at step 530. At step 532, the UE 502 is reconnected to the Wi-Fi network with IP2 (a new IP address from IP1) and the ePDG G/W 504 starts a MOBIKE timer for security associations received at step 518. In this example, the ePDG G/W 504 does not send and IKE delete message to the UE 502.

At step 534, the UE 502 sends an IKE information message to ePDG G/W 504. The message contains information to update the security association addresses for the new IP address IP2 assigned by Wi-Fi. At step 536, the ePDG G/W 504 sends an IKE dead peer detection (DPD) message to the UE 502 for the IP2. At step 538, the UE 502 sends an IKE DPD response for IP2 to ePDG G/W 504. Steps 540 and 542 include routability check IKE information messages.

At step 544, the ePDG G/W 504 updates the security associations and at 546, resets the MOBIKE timer. At step 548, the ePDG G/W 504 sends Encapsulating Security Payload (ESP) traffic with a new destination of IP2 to the UE 502.

Although FIG. 5 illustrates an example process for MOBIKE aware LTE Wi-Fi handoff optimization 500, various changes could be made to FIG. 5. For example, while shown as a series of steps, various steps in each figure could overlap, occur in parallel, occur in a different order, or occur multiple times.

Figure 6:
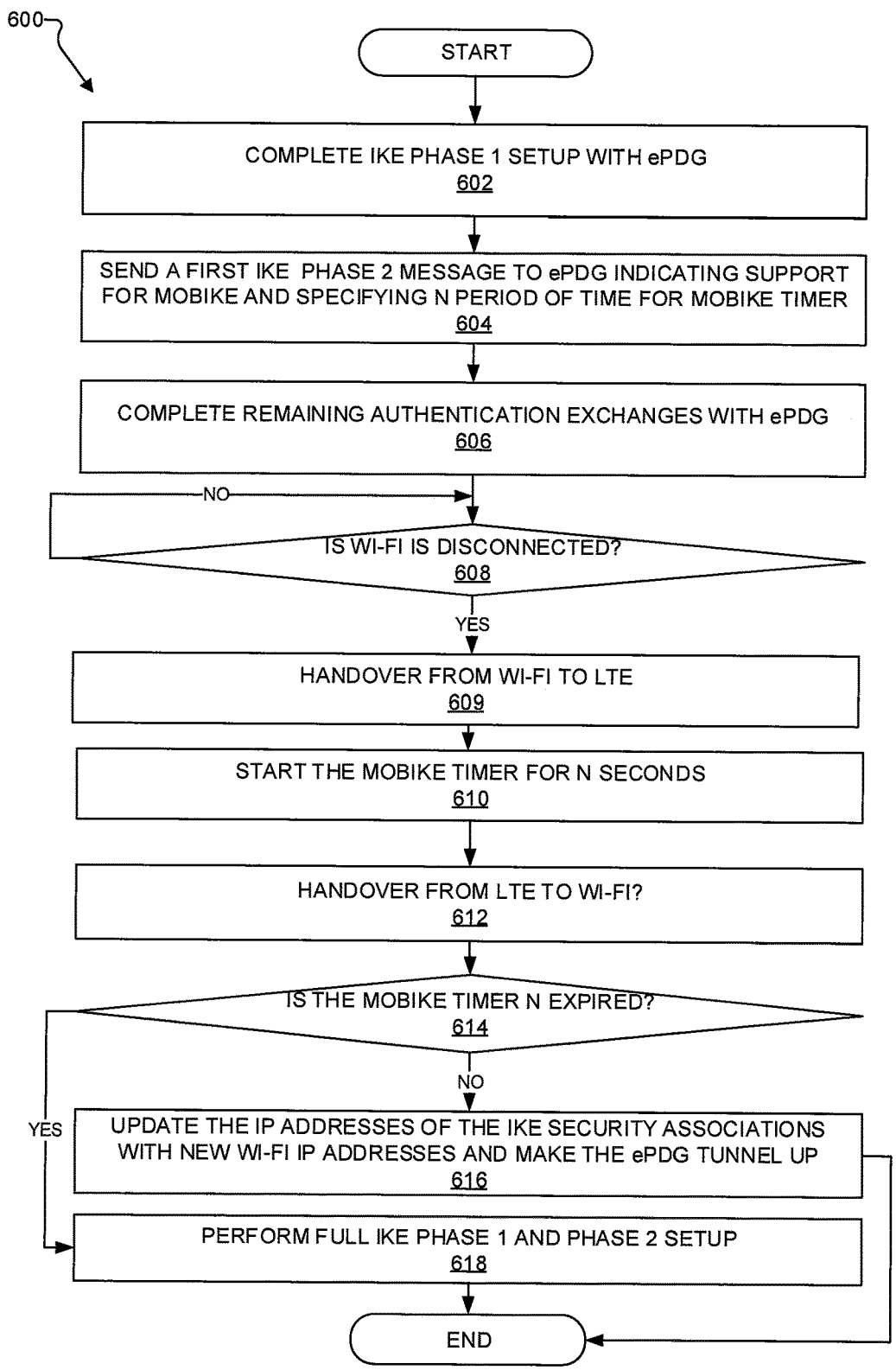
FIG. 6 illustrates an example process for using a MOBIKE timer value as a new vendor attribute in a configuration payload of an Internet Key Exchange authentication message according to embodiments of the present disclosure.

FIG. 6 illustrates an example process 600 for using a MOBIKE timer value as a new vendor attribute in a configuration payload of an Internet Key Exchange authentication message according to embodiments of the present disclosure. The embodiment of the process 600 illustrated in FIG. 6 is for illustration only. However, the process 600 comes in a wide variety of configurations, and FIG. 6 does not limit the scope of this disclosure to any particular implementation for using a MOBIKE timer value as a new vendor attribute in a configuration payload of an Internet Key Exchange authentication message. The steps as presented in FIG. 6 can be performed by a UE, such as UE 116 as show in in FIGS. 1 and 3, and UE 502 as shown in FIG. 5.

As shown in FIG. 6, at step 602, the UE completes an IKE security association (SA) initialization (IKE_SA_INIT) exchange with an ePDG. At step 604, the UE sends a first IKE authentication (IKE_AUTH) request message indicating N (MOBIKE_SUPPORTED) and specifying a period of time for a MOBIKE timer. The request message can include, for example, a new vendor attribute specifying the MOBIKE timer=N seconds that indicates how long the UE can maintain the state of the Ipsec tunnel even when Wi-Fi is disconnected without clearing the tunnel state.

At step 606, the UE completes the remaining IKE authentication exchanges with the ePDG. The IKE_AUTH messages exchange for EAP-AKA and the UE receives the last IKE_AUTH message with the IP address received and N (MOBIKE_SUPPORTED) indicating that the tunnel has been setup with MOBIKE enabled.

At step 608, the UE determines whether Wi-Fi is disconnected. Responsive to determining whether the Wi-Fi is not disconnected, the UE continues to monitor for disconnection of Wi-Fi. Responsive to the Wi-Fi disconnecting, at step 610, the UE starts a MOBIKE timer for N seconds. At this step 610 or after, the UE can also send, to the LTE network, a Wi-Fi to LTE handover message. When the LTE network receives this message, the LTE network can issue a command to delete the bearer on ePDG.

At step 612, the UE can perform a handover from LTE to Wi-Fi. In one example embodiment, step 612 does not occur immediately after step 610 and there can be voice communication over LTE between steps 610 and 612.

At step 614, the UE determines whether the MOBIKE timer is expired. In one example, step 614 is performed in response to step 612. If the MOBIKE timer is not expired, at step 616, the UE updates the IP addresses of IKE SAs. If the MOBIKE timer is expired, at step 618, the UE performs a full IKE phase 1 and phase 2 setup.

Although FIG. 6 illustrates example process 600 for using a MOBIKE timer value as a new vendor attribute in a configuration payload of an Internet Key Exchange authentication message, various changes could be made to FIG. 6. For example, while shown as a series of steps, various steps in each figure could overlap, occur in parallel, occur in a different order, or occur multiple times.

Figure 7:
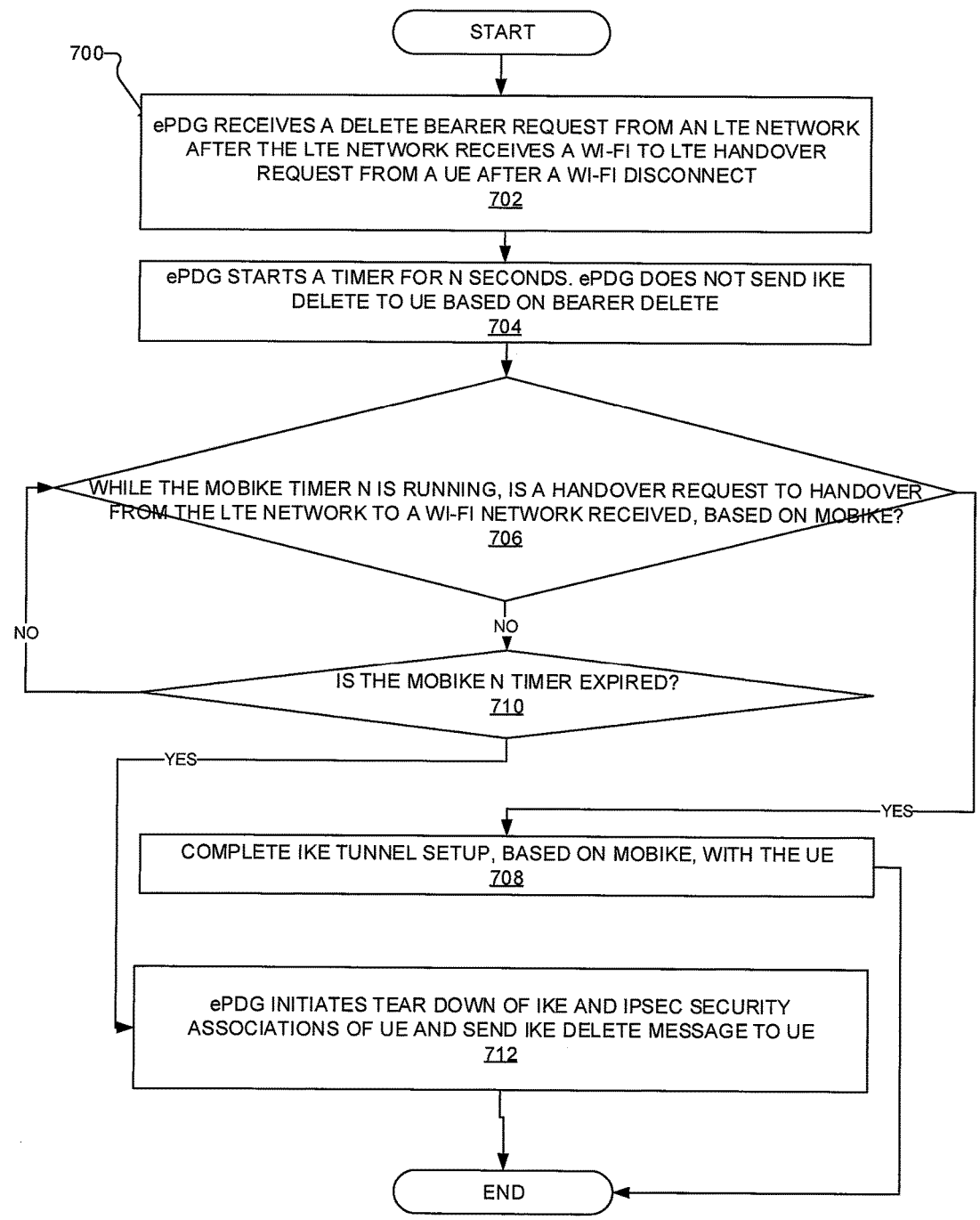
FIG. 7 illustrates an example process for using a MOBIKE timer value in a Wi-Fi network according to embodiments of the present disclosure.

FIG. 7 illustrates an example process 700 for using a MOBIKE timer value in a Wi-Fi network according to embodiments of the present disclosure. The embodiment of the process 700 illustrated in FIG. 7 is for illustration only. However, the process 700 comes in a wide variety of configurations, and FIG. 7 does not limit the scope of this disclosure to any particular implementation for using a MOBIKE timer value in a Wi-Fi network. The steps as presented in FIG. 7 can be performed by an ePDG, such as ePDG G/W 604 as shown in FIG. 6.

As shown in FIG. 7, at step 702, an ePDG receives a delete bearer request from an LTE network after the LTE network receives a Wi-Fi to LTE handover request from a UE after a Wi-Fi disconnect. The delete bearer request can be sent from the LTE network in response to a handover from the Wi-Fi network to the LTE network. At step 704, the ePDG starts a timer for N seconds. The ePDG does not send an IKE delete to the UE based on a bearer delete.

At step 706, while the MOBIKE N timer is running, it is determined whether a handover request to handover from the LTE network to a Wi-Fi network is received, based on MOBIKE. If there is a handover request received, then at step 708, the ePDG does not send the delete bearer request to the UE. The ePDG can cancel the delete bearer request. If there is no handover, then at step 710, the process determines whether the MOBIKE N timer is expired. If the MOBIKE N timer is not expired, then the process repeats step 706. IF the MOBIKE N timer is expired, then at step 712, the ePDG initiates a tear down of IKE and IPsec security associations of the UE and sends an IKE delete message to the UE. In another example embodiment, the ePDG may not wait for expiration of the timer, but instead may stop the timer in response to a handover from LTE network to the Wi-Fi network.

Although FIG. 7 illustrates example process 700 for using a MOBIKE timer value in a Wi-Fi network, various changes could be made to FIG. 7. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) for managing handovers between different networks, the UE comprising:
   a memory;
   at least one processor operably connected to the memory, the at least one processor configured to:
      establish security associations with an evolved data packet gateway (ePDG) over a Wi-Fi network,
      indicate multihoming protocol for Internet key exchange version 2 (MOBIKE) support,
      send an authentication request message to the ePDG, wherein the authentication request message includes a specific timer value corresponding to a specific period of time for maintaining the security associations,
      after establishing the security associations, perform a handover from the Wi-Fi network to a long term evolution (LTE) network, and
      maintain the security associations for the specific period of time corresponding to the specific timer value after performing the handover from the Wi-Fi network to the LTE network and disconnecting from the Wi-Fi network.

2. The UE of claim 1, wherein the at least one processor is further configured to:
   responsive to performing the handover from the Wi-Fi network to the LTE network, start a timer corresponding to the specific timer value for the specified period of time.

3. The UE of claim 2, wherein the at least one processor is further configured to:
   delete the security associations after expiration of the timer.

4. The UE of claim 2, wherein the at least one processor is further configured to:
   perform a handover from the LTE network to the Wi-Fi network;
   when the timer is not expired, connect with the Wi-Fi network using the security associations established prior to the handover from the Wi-Fi network to the LTE network; and when the timer is expired, connect with the Wi-Fi network by establishing new security associations with the ePDG over the Wi-Fi network.

5. The UE of claim 1, wherein the at least one processor is further configured to:
receive a delete bearer request from the ePDG after a MOBIKE timer of the ePDG expires.

6. A method of operating user equipment (UE) for managing handovers between different networks, the method comprising:
establishing security associations with an evolved data packet gateway (ePDG) over a Wi-Fi network;
indicating multihoming protocol for Internet key exchange version 2 (MOBIKE) support;
sending an authentication request message to the ePDG, wherein the authentication request message includes a specific timer value corresponding to a specific period of time for maintaining the security associations;
after establishing the security associations, performing a handover from the Wi-Fi network to a long term evolution (LTE) network; and
maintaining the security associations for the specific period of time corresponding to the specific timer value after performing the handover from the Wi-Fi network to the LTE network and disconnecting from the Wi-Fi network.

7. The method of claim 6, wherein maintaining the security associations during the period of time after disconnecting from the Wi-Fi network comprises:
responsive to performing the handover from the Wi-Fi network to the LTE network, starting a timer corresponding to the specific timer value for the specified period of time.

8. The method of claim 7, further comprising:
deleting the security associations after expiration of the timer.

9. The method of claim 7, further comprising:
performing a handover from the LTE network to the Wi-Fi network;
when the timer is not expired, connecting with the Wi-Fi network using the security associations established prior to the handover from the Wi-Fi network to the LTE network; and
when the timer is expired, connecting with the Wi-Fi network by establishing new security associations with the ePDG in the Wi-Fi network.

10. The method of claim 6, receiving a delete bearer request from the ePDG after a MOBIKE timer of the ePDG expires.

11. An evolved data packet gateway (ePDG), the ePDG comprising:
a memory;
at least one processor operably connected to the memory, the at least one processor configured to:
establish internet key exchange (IKE) security associations with a user equipment (UE) over a Wi-Fi network,
receive, from the UE, an indication of multihoming protocol for Internet key exchange version 2 (MOBIKE) support,
receive, from the UE, an authentication request message from the UE, wherein the authentication request messages includes a specific timer value corresponding to a specific period of time for maintaining the IKE security associations,
after establishing the IKE security associations and a handover of the UE from the Wi-Fi network to a long term evolution (LTE) network, receive a delete bearer request from the LTE network, and
start a MOBIKE timer using the specific timer value for the specific period of time in response to receiving the delete bearer request from the LTE network.

12. The ePDG of claim 11, wherein the at least one processor is further configured to:
withhold sending an internet key exchange (IKE) delete request to the UE in response to delete bearer request from LTE; and
maintain the IKE security association of the UE while the MOBIKE timer is running.

13. The ePDG of claim 12, wherein the at least one processor is further configured to:
after MOBIKE timer for the specified time expires, initiate a tear down of the IKE security associations of the UE; and
send the IKE delete request to the UE.

14. The ePDG of claim 12, wherein the at least one processor is further configured to:
while the MOBIKE timer is running, determine whether a handover request to handover from the LTE network to a Wi-Fi network is received, based on MOBIKE.

15. The ePDG of claim 14, wherein the at least one processor is further configured to:
responsive to receiving the handover request while the MOBIKE timer is running, update the IKE security associations of the UE with a new internet protocol (IP) address and sets an IKE tunnel.

16. The ePDG of claim 11, wherein the at least one processor is further configured to:
start a MOBIKE timer using the specific timer value for the specific period of time in response to receiving a delete bearer request from the LTE network.

17. The ePDG of claim 16, wherein the at least one processor is further configured to:
withhold sending the delete bearer request to the UE before the MOBIKE timer expires.

* * * * *